3,699,035
Patented Oct. 17, 1972

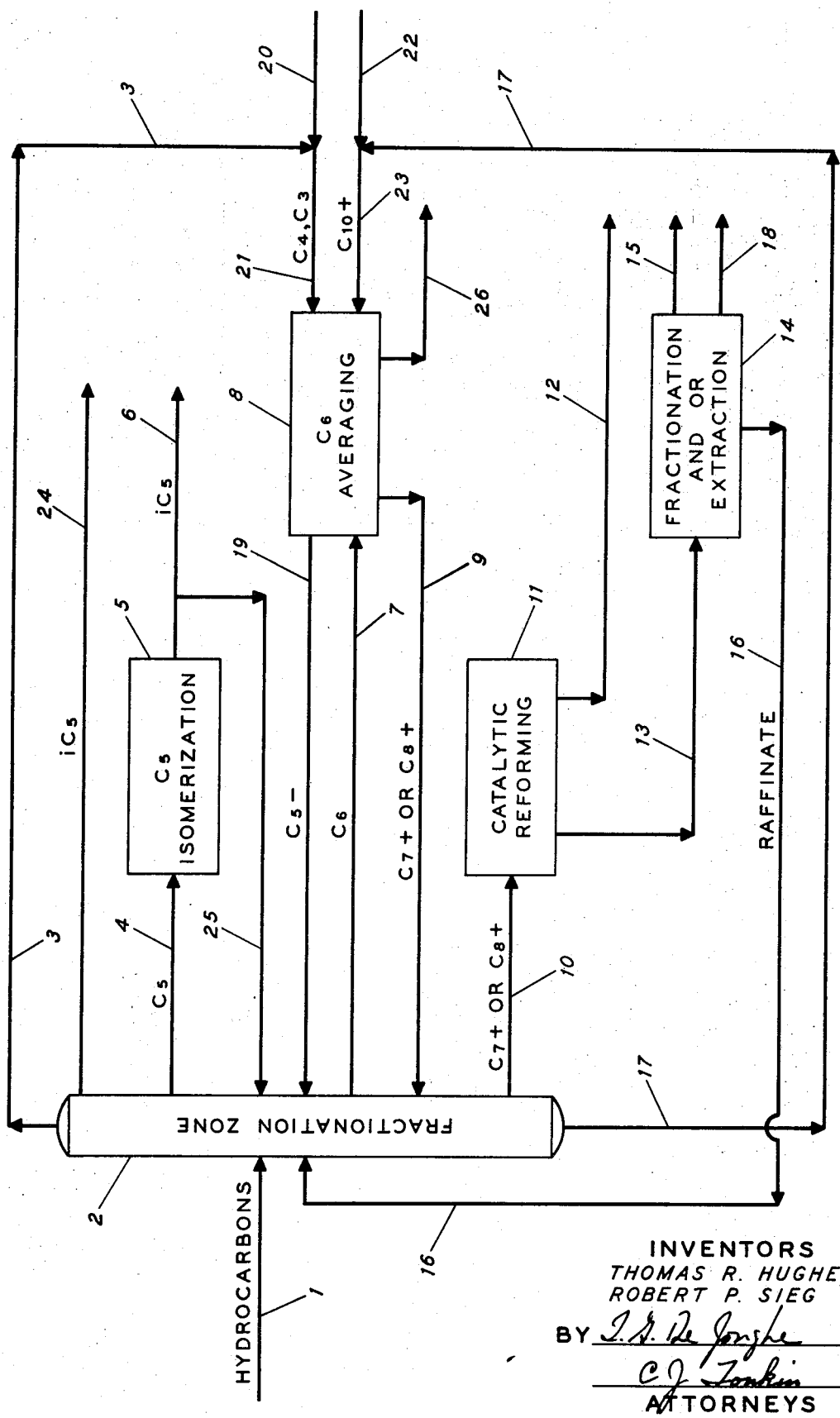

3,699,035
PRODUCTION OF GASOLINE BY AVERAGING AND REFORMING
Thomas R. Hughes, Orinda, and Robert P. Sieg, Piedmont, Calif., assignors to Chevron Research Company, San Francisco, Calif.
Continuation-in-part of applications Ser. No. 864,870 and Ser. No. 864,871, both Oct. 8, 1969. This application July 1, 1970, Ser. No. 51,459
Int. Cl. C10g 39/00
U.S. Cl. 208—92
10 Claims

ABSTRACT OF THE DISCLOSURE

A process for producing gasoline from a hexane-rich hydrocarbon feed which comprises averaging hexane with one or more alkanes selected from the group consisting of propane or butanes or $C_{10}^+$ hydrocarbons or mixtures of the foregoing hydrocarbons to obtain at least $C_7^+$ hydrocarbons, and catalytically reforming the $C_7^+$ hydrocarbons to obtain reformate. Preferably at least a portion of the hydrocarbons averaged with the hexane is raffinate derived from extraction following the catalytic reforming step. Preferably, a portion of the n-pentane produced in hexane averaging is isomerized to isopentane.

CROSS REFERENCES

This application is a continuation-in-part of applications Ser. Nos. 864,870 and 864,871, filed Oct. 8, 1969, both now abandoned, the disclosures of which applications are incorporated by reference into the present patent application.

BACKGROUND OF THE INVENTION

The present invention relates to averaging and catalytic reforming. More particularly, the present invention relates to the averaging of alkanes, especially hexane, and the catalytic reforming of hydrocarbons. The present invention also relates to normal pentane isomerization integrated into combined hexane averaging and naphtha reforming.

The term "averaging" is used in this specification to mean conversion of feed components or hydrocarbon molecules of different molecular weight to at least components of intermediate molecular weight relative to the respective average molecular weights of the feed components. The term averaging is used herein to include, however, conversion to components of molecular weight higher than the average molecular weight of the heavier feed to the averaging reaction. For example, in an averaging reacton between butane and hexane, the butane and hexane are converted to hydrocarbons such as pentane, heptane and octane.

Averaging of alkanes is discussed further in applications Ser. Nos. 864,870 and 864,871. The averaging processes disclosed in Ser. Nos. 864,870 and 864,871 are preferably carried out at a relatively low temperature, usually below about 850° F. According to the aforementioned patent applications, the averaging reaction is carried out using a catalytic mass having hydrocarbon dehydrogenation activity and olefin disproportionation activity or using a catalytic mass comprising a Group VIII component and a Group VI–B component.

Catalytic reforming has been practiced increasingly in petroleum refineries since about 1940. Nearly all the conventional present catalytic reforming processes use a catalyst comprising platinum on alumina. Usually, the reaction temperatures for catalytic reforming are between about 850 and 1100° F., and the reaction is carried out in the presence of hydrogen. Catalytic reforming in general, and a particularly preferred catalytic reforming process, are described in U.S. Pat. 3,415,737, the disclosure of which patent is incorporated by reference into the present application.

The present invention is directed to the integration of alkane averaging and catalytic reforming and the present invention is especially concerned with the upgrading of hexane or hydrocarbon feedstocks containing hexane, to obtain higher octane gasoline boiling range hydrocarbons.

The hexane isomers present a unique problem among the alkanes of the gasoline boiling range. The butanes have high blending octane numbers and are limited as gasoline components only by their high vapor pressure. Normal pentane can be isomerized to produce a blend with a fairly acceptable octane number. The $C_7$ to $C_9$ alkanes can be converted into high octane number aromatic hydrocarbons by catalytic reforming. However, isomerization of hexanes produces a blend with low octane number, and reforming of hexanes produces only low yields of benzene. One purpose of the present invention is to provide a means for conversion of hexanes into compounds with higher octane numbers.

SUMMARY OF THE INVENTION

According to the present invention, a process is provided for producing gasoline from a hexane-rich hydrocarbon feed which comprises averaging hexane with one or more alkanes selected from the group consisting of propane or butanes or $C_{10}^+$ hydrocarbons or mixtures of the foregoing hydrocarbons to obtain at least $C_7^+$ hydrocarbons, and catalytically reforming the $C_7^+$ hydrocarbons to obtain reformate.

The term "hexane-rich" is used herein to connote a steam containing a substantial amount of $C_6$ hydrocarbons, usually at least one or two weight percent hexane and preferably at least 5 or 10 weight percent hexane. The process of the present invention can, of course, be applied to pure hexane streams, but in most instances, the hexane will be present together with other hydrocarbons.

The averaging of the hexane will result in hydrocarbons having lower molecular weight than the hexane, i.e., $C_5$ and lower hydrocarbons, as well as hydrocarbons having a molecular weight higher than the hexane, i.e., $C_7$ and higher boiling hydrocarbons. The $C_5$ and lighter hydrocarbons are herein sometimes referred to as $C_5^-$ hydrocarbons and the $C_7$ and higher boiling hydrocarbons are sometimes referred to herein as $C_7^+$ hydrocarbons. The $C_5^-$ hydrocarbons are primarily $C_5$, $C_4$, $C_3$ and $C_2$ hydrocarbons. The $C_7^+$ hydrocarbons are primarily $C_7$, $C_8$, $C_9$, $C_{10}$, $C_{11}$ and $C_{12}$ hydrocarbons but the $C_7^+$ hydrocarbons can boil as high as about 400 to 500° F. Usually, the $C_7^+$ hydrocarbons will boil at least as high as the end point of the $C_{10}^+$ feed fraction.

Although the hydrocarbon feedstocks for the averaging step of the present invention may be designated simply as $C_6$ or $C_3$, $C_4$ or $C_{10}^+$, etc., it is to be understood that the averaging reaction is directed to the reaction of different molecular weight paraffins (alkanes) and that therefore the hydrocarbon streams fed to the averaging step of the present invention will contain at least substantial amounts of paraffins.

Preferably, the averaging is carried out by contacting the hexane with a catalytic mass having catalytic activity for paraffin dehydrogenation as well as catalytic activity for olefin averaging. A particularly preferred catalyst for the averaging of hexane with other hydrocarbons fed to the averaging zone in the present invention comprises platinum on alumina and a Group VI–B metal on a refractory support.

Preferred catalysts for use in the averaging zone in the process of the present invention are disclosed in applications Ser. Nos. 864,870 and 864,871.

According to a particularly preferred embodiment of the present invention, a combination process is provided for converting paraffinic hydrocarbons into gasoline which comprises (a) separating a hydrocarbon feed stream into a $C_5$ rich stream, a $C_6$ rich stream and a $C_7^+$ stream, (b) isomerizing normal pentane present in the $C_5$ rich stream to obtain isopentane, (c) averaging the $C_6$ rich stream with a hydrocarbon selected from the group consisting of propane or butanes or $C_{10}^+$ hydrocarbons or mixtures of the foregoing hydrocarbons to obtain at least $C_5^-$ hydrocarbons and $C_7^+$ hydrocarbons, and (d) catalytically reforming at least a portion of the $C_7^+$ stream and the $C_7^+$ hydrocarbons from averaging to produce reformate.

Normal butane is preferred over isobutane for averaging with hexane.

The isomerization step according to the above preferred embodiment can operate on all or only on a portion of the normal pentane present in the hexane-rich feed to the process of the present invention. However, it is particularly preferred to feed at least a portion of the normal pentane produced in the averaging step to the $C_5$ isomerization step. Isopentane produced by the isomerization is a high octane gasoline blending component.

The $C_7^+$ feed to the catalytic reforming step of the process of the present invention can be altered somewhat by feeding the $C_7$ hydrocarbons to the averaging step and feeding only the $C_8^+$ hydrocarbons to the catalytic reforming step. In either case, the $C_7^+$ or $C_8^+$ feed to the catalytic reforming step will usually boil in the naphtha boiling range or from about $C_7$ or $C_8$ up to about 400 or 450° F.

The catalytic reforming step is generally carried out using a platinum on alumina catalyst. Preferably, the catalyst also contains between about 0.01 and 5 weight percent rhenium. In any event, the catalytic reforming step will operate to substantially increase the octane number of the naphtha feed to the reforming step.

In general, substantial amounts of aromatics including xylenes will be produced in the catalytic reforming step. According to a preferred embodiment of the present invention, at least a portion of the aromatics present in at least a portion of the effluent from the catalytic reforming step is fractionated or extracted from the reforming effluent and the remaining paraffinic-rich hydrocarbons, for example, the paraffinic-rich raffinate, is recycled at least in part to the averaging step. Recycling the paraffinic raffinate to the averaging step is especially advantageous because the paraffinic raffinate usually has a relatively low octane number and the averaging step can operate to substantially raise the quality of the raffinate by averaging the raffinate with hexane to produce $C_7^+$ hydrocarbons, which hydrocarbons can be advantageously catalytically reformed.

It is particularly advantageous to feed the raffinate to a common fractionation zone so that $C_5$ hydrocarbons can be separated from the raffinate and then isomerized in an isomerization zone. The $C_6$ or $C_6$ and $C_7$ hydrocarbons in the raffinate preferably are fractionated from the raffinate and fed to the averaging zone for upgrading, at least in part, to higher molecular weight hydrocarbons which, in turn, can be fed to the catalytic reforming step of the present invention.

The hydrocarbon fresh feed stream to the process of the present invention can boil over a wide range such as $C_3$ up to $C_{10}^+$ ($C_{10}$ to about $C_{16}$) hydrocarbons. Highly paraffinic feedstocks boiling up to about 500 or 600° F. are preferred hydrocarbon feeds. According to one preferred embodiment of the present invention, light hydrocarbons such as propane and butanes are separated from the fresh hydrocarbon feed and fed to the averaging step of the present invention for reaction with hexane to form $C_7^+$ hydrocarbons which subsequently are catalytically reformed. Operation in this manner is advantageous in that very light hydrocarbons are converted at least in part into heavier valuable gasoline.

In addition to averaging $C_3$ or $C_4$ paraffinic hydrocarbons fractionated from the fresh feed to the process of the present invention, $C_3$ and $C_4$ alkanes obtained from catalytic reforming are also advantageously averaged with hexane in the averaging step of the present invention. Due to the small amount of cracking type reactions which occur during catalytic reforming, there are usually at least minor amounts of light hydrocarbons such as propane and butanes produced during the catalytic reforming and it is, of course, advantageous to be able to convert these light hydrocarbons into more valuable heavy hydrocarbons such as gasoline.

$C_{10}^+$ hydrocarbons present in the fresh hydrocarbon feed to the process of the present invention as, for example, $C_{10}$ to about $C_{20}$ paraffinic hydrocarbons, are a particularly preferred feed for averaging with hexanes in the process of the present invention to produce a high yield of a $C_7^+$ hydrocarbon stream for catalytic reforming in accordance with the process of the present invention.

In accordance with a preferred embodiment of the present invention, a combination process is provided for converting paraffinic hydrocarbons into gasoline which comprises (a) separating a $C_3^+$ hydrocarbon feed stream into a $C_3$, $C_4$ stream, a $C_5$ rich stream, a $C_6$ rich stream, a $C_7^+$ stream, and a $C_{10}^+$ stream, (b) isomerizing normal pentane present in the $C_5$ rich stream to obtain isopentane, (c) averaging hexanes present in the $C_6$ rich stream with alkanes present in the $C_3$, $C_4$ and the $C_{10}^+$ hydrocarbon streams to obtain at least $C_7^+$ hydrocarbons, and (d) catalytically reforming at least a portion of the $C_7^+$ stream and the $C_7^+$ hydrocarbons from averaging to produce reformate. Preferably, at least a portion of the product from the averaging reaction is fed to a fractionation zone wherein a pentane-rich stream, a $C_6$ rich stream, and a $C_7^+$ stream are separated from the product. Preferably, the pentane-rich stream is fed to $C_5$ isomerization, the $C_6$ rich stream is recycled to the averaging reaction zone and the $C_7^+$ stream is fed to catalytic reforming.

BRIEF DESCRIPTION OF THE DRAWING

The drawing is a schematic process flow diagram illustrating a preferred embodiment of the process of the present invention.

DETAILED DESCRIPTION OF THE DRAWING

Referring now more specifically to the drawinng, a hydrocarbon fresh stream is fed via line 1 to fractionation zone 2. To a large extent, as is schematically indicated in the drawing, the effluent streams from the processing steps of the present invention and the fresh feed can be handled in one common fractionation zone. The hydrocarbon fresh feed stream is separated in the fractionation zone into a number of hydrocarbon cuts, most of which are indicated on the drawing. In many instances, it is advantageous to use more than one fractionation column in the fractioation zone.

To aid in the use of a common fractionation zone, in some instances it is preferable to employ vapor side draws from the fractionation column or columns, as well as liquid side draws. Thus, the hexane-rich withdrawal from the fractionation zone schematically indicated by arrow 7 from the fractionation zone to averaging zone 8 can be a vapor withdrawal.

The $C_5^-$ feed to the fractionation zone via line 19 from averaging zone 8 usually will contain substantial amounts of $C_2$ and $C_3$ hydrocarbons in addition to butanes and pentanes. The $C_2$, $C_3$ and $C_4$ hydrocarbons can be withdrawn from the fractionation zone via line 3 and processed further, if necessary, to obtain liquefied petroleum gasoline (LPG). However, in the process of the present invention, it is usually preferred to average at least a portion of the propane or the butanes with hexane in averaging zone 8 by feeding the propane or butanes via lines 3 and 21 to zone 8. Additional light hydrocarbons can be fed to zone 8 for averaging with hexane as indicated by line 20.

Isopentane present in the fresh feed to the fractionation zone and/or isopentane recycled together with normal pentane via line 25 to the fractionation zone is preferably withdrawn as an isopentane rich stream via line 24.

$C_5$ hydrocarbons, particularly normal pentane, are withdrawn via line 4 rom the fractionation zone. Preferably, this $C_5$ rich hydrocarbon stream is fed to isomerization zone 5 for the conversion of normal pentane into the much higher octane constituent for gasoline, isopentane. The isopentane is advantageously blended with high octane reformate produced in catalytic reforming zone 11.

A number of different catalysts can be used for normal pentane isomerization. Catalysts such as two percent aluminum chloride dissolved in antimony trichloride have been used for pentane isomerization carried out under a hydrogen pressure of about 60–100 p.s.i.g. to suppress side reactions. Other acidic type solid isomerization catalysts can be used to effect the normal pentane isomerization. Particularly preferred catalysts comprise layered clay-type crystalline aluminosilicate catalysts, such as described in U.S. Pat. 3,252,757.

A hexane-rich hydrocarbon stream is withdrawn via line 7 from the fractionation zone and is fed to averaging zone 8. The hexane-rich feed usually contains at least about 10 weight percent hexane and preferably 35 weight percent or more hexane. The hexane-rich stream con contain both lighter and heavier hydrocarbons than hexane. According to the present invention, the two most preferred hexane-rich feed streams are (a) a predominantly $C_6$ paraffin stream boiling between about 136 and 156° F. or (b) predominantly $C_6$ and $C_7$ paraffins boiling between about 136 and 209° F.

As indicated previously, preferably the averaging of the hexane with other hydrocarbons is carried out at a temperature below 850° F., and more preferably, below 800° F., and in the presence of no more than about five weight percent olefins, by contacting the hexane and other hydrocarbon feedstock with a catalytic mass having catalytic activity for dehydrogenation of paraffins as well as catalytic activity for olefin averaging. The catalytic mass can comprise a physical mixture of catalyst particles which are active for hydrocarbon dehydrogenation and catalyst particles which are active for olefin averaging. Preferably, the catalytic mass comprises a noble metal or a noble metal compound on a refractory support, in addition to an olefin averaging component. Thus, preferred catalyst masses include platinum on alumina particles mixed with tungsten oxide on silica particles. Catalyst masses comprising a Group VIII component in addition to a Group VI-B component are generally suitable in the $C_6$ averaging process of the present invention.

It is preferred in the process of the present invention to operate the averaging reaction zone at a pressure above about 200 p.s.i.g., more preferably above about 400 p.s.i.g., and still more preferably above about 800 p.s.i.g. The elevated pressure has been found advantageous because it leads to higher conversion. The residence time of the reactant in the reaction zone increases with increasing pressure. Also, the equilibrium partial pressures of both olefin and $H_2$ formed from dehydrogenation of saturated hydrocarbons rise in direct proportion to the square root of the total pressure. Thus, relatively high pressure, of the order of 500–1500 p.s.i.g., is particularly preferred.

Hydrocarbons produced in averaging zone 8 are usually removed via line 9 and fed to fractionation zone 2. It is to be understood that in some instances, there will be fractionation or separation facilities as part of averaging zone 8 in order to separate the lighter hydrocarbons, for example, $C_5^-$, from the heavier hydrocarbons. In that event, the $C_5^-$ fraction can be returned via line 19 to fractionation zone 2, thus providing facility for removal of $C_2^-$ product via line 28. In some instances, the $C_7^+$ fraction from the disproportionation zone is preferably fed directly to catalytic reforming zone 11. But usually, it is preferred to feed the $C_7^+$ material from the averaging zone to common fractionation zone 2 so that the desired $C_7^+$ feed comprising a mixture of $C_7^+$ hydrocarbons in the initial feed added via line 1 and the $C_7^+$ hydrocarbons obtained by averaging can be withdrawn together from the common fractionation zone via line 10 and fed to catalytic reforming zone 11. Any heavy bottom not desired to be fed to catalytic reforming can be withdrawn from the fraction zone via line 17.

$C_{10}^+$ hydrocarbons can be fractionated from the fresh hydrocarbon feed in common fractionation zone 2 and removed via line 17. It is advantageous to feed the $C_{10}^+$ hydrocarbons, particularly $C_{10}$ to about $C_{15}$ hydrocarbons, to zone 8 for averaging with hexane as large yields of $C_7^+$ hydrocarbons can thereby be obtained. In particular, high yields of $C_8$ and $C_9$ hydrocarbons which are particularly attractive paraffinic feedstocks for catalytic reforming in zone 11 can be obtained by averaging the $C_{10}^+$ alkanes with the hexane. The $C_{10}^+$ hydrocarbons may be withdrawn in part or totally via line 27 or be fed to zone 8 from the common fractionation zone via lines 17 and 23 and additional heavy hydrocarbons such as $C_{10}^+$ hydrocarbons can be fed to averaging zone 8 via lines 22 and 23. If desired, branched chain hydrocarbons which may build up due to lower reactivity, can be withdrawn as a bleed stream from zone 8 via line 26.

Catalytic reforming zone 11 is preferably operated at a temperature between 850 and 1100° F. and at a hydrogen partial pressure between about 40 and 1000 p.s.i.g. Preferred catalysts are catalysts containing one or more noble metals on a refractory support such as platinum on alumina. Preferably, the reforming catalyst also contains a small amount of a halide to promote the activity of the catalyst for hydroisomerization. The platinum or noble metal component of the catalyst is believed to be mainly responsible for the dehydrocyclization reaction or reactions necessary to convert paraffinic hydrocarbons to aromatics. The term "catalytic reforming" is used herein to refer to hydrocarbon processing wherein substantial amounts of paraffins are converted to aromatics so as to obtain a reformate which, usually after removal of at least some light ends, has a substantially increased octane rating relative to the paraffinic feedstocks to the reforming process. Particularly preferred catalysts for upgrading the octane level of the paraffinic feed to catalytic reforming zone 11 are catalysts comprising platinum and rhenium on alumina such as described in U.S. Pat. 3,415,737.

Product reformate can be withdrawn from zone 11 via line 12, usually after separating a small amount of light hydrocarbons in separation or distillation facilities which are a part of zone 11. However, in the process of the present invention, it is particularly preferred to feed at least a portion of the effluent from catalytic reforming zone 11 to fractionation and/or extraction zone 14 via line 13. Zone 14 is operated so as to separate a paraffinic-rich hydrocarbon stream from higher octane primarily aromatic hydrocarbons. The paraffinic-rich stream is recycled via line 16 to the fractionation zone so that the recycle stream can be upgraded in octane level. The most important means of upgrading the recycle stream in octane level is by the averaging of hexanes present in the recycle stream followed by catalytic reforming of the heavier hydrocarbons obtained in the averaging of the hexanes. Also, in the process of the present invention, normal pentane present in the recycle paraffinic-rich stream can be increased in octane rating by means of isomerization in zone 5.

It is particularly preferred to separate the paraffinic-rich recycle stream by solvent extraction in zone 14 using a solvent which selectively takes aromatics into solution with the solvent such as glycol-water solutions (frequently referred to as Udex) or furfural or other aromatic solvents. The material left after the aromatics have been extracted is generally referred to as raffinate. The raffinate is a preferred paraffinic-rich hydrocarbon stream for averaging with hexane in zone 8, usually after the raffinate has been further processed by fractionation to remove light hydrocarbons to obtain a $C_6$ rich stream for feed to averaging zone 8.

Various aromatic-rich fractions can be withdrawn from zone 14 but only two withdrawals via line 15 and 18 are indicated from zone 14. The two preferred withdrawals are a xylene-rich aromatic stream for use in a chemical plant such as a paraxylene plant, and a high octane aromatic gasoline stream for use as motor fuel.

EXAMPLE

This example illustrates approximately the operation of the present invention with results obtained in averaging a feedstock slightly lighter than hexane, specifically, normal butane, with another hydrocarbon, specifically, a raffinate left after solvent extraction of aromatics from a portion of the effluent from a catalytic reforming process. The composition of the raffinate can be seen from Table I below to be primarily $C_8$ and $C_9$ paraffins.

The conditions used to carry out the averaging reactions included a temperature of about 800° F., a pressure of about 900 p.s.i.g., a feed rate of about 9 cubic centimeters per hour of 1 part by volume raffinate with 2 parts by volume normal butane, a liquid hourly space velocity of 1.0, and catalyst consisting of 2 parts by volume of a 0.5 weight percent platinum plus 0.5 weight percent lithium on alumina together with 7 parts by volume of 8.0 percent tungsten oxide (calculated as tungsten) on silica.

TABLE I

| Components | Feed, wt. percent | Product, wt. percent | Net change |
|---|---|---|---|
| $C_1$ | | 0.53 | +0.53 |
| $C_2$ | | 1.70 | +1.70 |
| $C_3$ | | 8.97 | +8.97 |
| $i\text{-}C_4H_{10}$ | | 1.05 | +1.05 |
| $n\text{-}C_4H_{10}$ | 63.17 | 22.81 | −40.36 |
| $i\text{-}C_5H_{12}$ | | 2.48 | +2.48 |
| $n\text{-}C_5H_{12}$ | | 8.26 | +8.26 |
| $br\text{-}C_6H_{14}$ | | 3.51 | +3.51 |
| $n\text{-}C_6H_{14}$ | | 5.78 | +5.78 |
| $br\text{-}C_7H_{16}$ | 0.10 | 4.50 | +4.40 |
| $n\text{-}C_7H_{16}$ | 0.67 | 4.30 | +3.63 |
| $br\text{-}C_8H_{18}$ | 17.43 | 9.72 | −7.71 |
| $n\text{-}C_8H_{18}$ | 3.80 | 2.90 | −0.90 |
| $br\text{-}C_9H_{20}$ | 10.43 | 9.63 | −0.80 |
| $n\text{-}C_9H_{20}$ | 1.37 | 1.19 | −0.18 |
| $br\text{-}C_{10}H_{22}$ | 1.79 | .688 | +5.09 |
| $n\text{-}C_{10}H_{22}$ | 0.27 | 0.20 | +0.07 |
| $C_{11}+$ | 0.98 | 5.08 | +4.10 |

In Table I above, i stands for iso, n stands for normal and br stands for branched chain. The composition of the feed was about 82.1 percent paraffins, 12.3 percent naphthenes, and 5.7 percent aromatics by weight. Because only raffinate was fed to the reaction zone, the reactions were primarily disproportionation of hydrocarbon molecules such as $C_8$ or $C_9$ molecules.

As can be seen from the table, a relatively high yield of hydrocarbons of molecular weight intermediate to butane and the raffinate were produced in the averaging reaction. Based on our other laboratory data, if hexane is used as the light hydrocarbon feed for the averaging reaction instead of normal butane, production of primarily $C_7+$ hydrocarbons occurs. Substantial amounts of the hexane would be averaged upward similarly to the averaging upward of the butane as shown in Table I above. The resulting paraffinic hydrocarbons which are highest in yield intermediate to the light hydrocarbon molecular weight and the molecular weight of the raffinate are particularly advantageous feedstocks for pentane isomerization and for catalytic reforming to produce high octane gasoline.

Although various embodiments of the invention have been described, it is to be understood that they are meant to be illustrative only and not limiting. Certain features may be changed. It is apparent that the present invention has broad application to increasing the octane rating of hexane-rich hydrocarbons by a combination of at least hexane averaging with other hydrocarbons and catalytic reforming of hydrocarbons heavier than hexane. Accordingly, the invention is not to be construed as limited to the specific embodiments or examples discussed but only as defined in the appended claims.

We claim:

1. A combination process for converting paraffinic hydrocarbons into gasoline which comprises:
   (a) separating a hydrocarbon feed stream into a $C_5$ rich stream, a $C_6$ rich stream and a $C_7+$ stream,
   (b) isomerizing normal pentane present in the $C_5$ rich stream to obtain isopentane,
   (c) averaging the $C_6$ rich stream with a hydrocarbon selected from the group consisting of propane or butane or $C_{10}+$ hydrocarbons or mixtures of the foregoing hydrocarbons to obtain at least $C_5^-$ hydrocarbons and a $C_7+$ hydrocarbon fraction, and wherein the hexane averaging is carried out by contacting the hexane and other alkanes with a catalytic mass having catalytic activity for paraffin dehydrogenation as well as catalytic activity for olefin averaging, and
   (d) catalytically reforming in the presence of hydrogen gas and using a catalyst containing platinum at least a portion of the $C_7+$ stream and the $C_7+$ hydrocarbon fraction from averaging to produce reformate.

2. A process in accordance with claim 1 wherein a normal pentane rich hydrocarbon stream is separated from the $C_5^-$ hydrocarbons from averaging and the normal pentane rich hydrocarbon stream is isomerized to obtain $iC_5$.

3. A process in accordance with claim 1 wherein the hexane averaging is carried out by contacting the hexane with a catalytic mass having catalytic activity for paraffin dehydrogenation as well as catalytic activity for olefin averaging.

4. A process in accordance with claim 3 wherein the catalytic mass comprises platinum on alumina and a Group VI-B metal on a refractory support.

5. A process in accordance with claim 4 wherein the averaging reaction is carried out at a temperature below 850° F. and in the presence of no more than five weight percent olefins.

6. A combination process for converting paraffinic hydrocarbons into gasoline which comprises:
   (a) separating a hydrocarbon feed stream into at least a $C_3$, $C_4$ rich stream, a $C_6$ rich stream and a $C_7+$ stream,
   (b) averaging hexane in the $C_6$ rich stream with at least a portion of the alkanes in the $C_3$, $C_4$ hydrocarbon stream to obtain at least $C_7+$ hydrocarbon fraction, and wherein the hexane averaging is carried out by contacting the hexane and the other alkanes with a catalytic mass having catalytic activity for paraffin dehydrogenation as well as catalytic activity for olefin averaging, and
   (c) catalytically reforming in the presence of hydrogen gas and using a catalyst containing platinum at least a portion of the $C_7+$ hydrocarbon fraction from the averaging step to produce reformate.

7. A process in accordance with claim 6 wherein at least a portion of the $C_3$ or $C_4$ alkanes reacted with hexane in the averaging step are obtained by separating $C_3$ and $C_4$ hydrocarbons from effluent from the catalytic reforming step.

8. A combination process for converting paraffinic hydrocarbons into gasoline which comprises:
   (a) separating a hydrocarbon feed stream into a $C_6$ rich stream, a $C_7+$ stream and a $C_{10}+$ stream,
   (b) averaging hexanes in the $C_6$ rich stream with at least a portion of the alkanes in the $C_{10}{}^+$ stream to obtain at least $C_7{}^+$ hydrocarbon fraction, and wherein the hexane averaging is carried out by contacting the hexane and the other alkanes with a catalytic mass having catalytic activity for paraffin dehydrogenation as well as catalytic activity for olefin averaging, and (c) catalytically reforming in the presence of hydrogen gas and using a catalyst containing platinum at least a portion of the $C_7{}^+$ hydrocarbon fraction from the averaging step to produce reformate.

9. A combination process for converting paraffinic hydrocarbons into gasoline which comprises:

(a) separating a hydrocarbon feed stream into a $C_3$, $C_4$ stream, a $C_5$ rich stream, a $C_6$ rich stream, a $C_7{}^+$ rich stream, and a $C_{10}{}^+$ rich stream, (b) isomerizing normal pentane present in the $C_5$ rich stream to obtain isopentane, (c) averaging hexanes present in the $C_6$ rich stream with alkanes present in the $C_3$, $C_4$ and the $C_{10}{}^+$ hydrocarbon streams to obtain at least $C_7{}^+$ hydrocarbon fraction, and wherein the hexane averaging is carried out by contacting the hexane and the other alkanes with a catalytic mass having catalytic activity for paraffin dehydrogenation as well as catalytic activity for olefin averaging, and (d) catalytically reforming in the presence of hydrogen gas and using a catalyst containing platinum at least a portion of the $C_7{}^+$ stream and the $C_7{}^+$ hydrocarbon fraction from averaging to produce reformate.

10. A process in accordance with claim 1 wherein at least a portion of the reformate is separated by solvent extraction into an aromatics-rich stream and a raffinate stream rich in paraffins, and at least a portion of the raffinate is averaged with hexane to obtain $C_7{}^+$ hydrocarbons which are catalytically reformed.

References Cited

UNITED STATES PATENTS

| | | | |
|---|---|---|---|
| 3,136,825 | 6/1964 | Ryan et al. | 208—65 |
| 3,502,570 | 3/1970 | Pollitzer | 208—65 |
| 3,558,479 | 1/1971 | Jacobson et al. | 208—141 |

HERBERT LEVINE, Primary Examiner

U.S. Cl. X.R.

208—65, 79, 141